(12) United States Patent
Kerstan et al.

(10) Patent No.: US 7,692,790 B2
(45) Date of Patent: Apr. 6, 2010

(54) GRATING SPECTROMETER SYSTEM AND METHOD FOR THE ACQUISITION OF MEASURED VALUES

(75) Inventors: Felix Kerstan, Jena (DE); Nico Correns, Weimar (DE)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 11/382,584

(22) Filed: May 10, 2006

(65) Prior Publication Data
US 2006/0268270 A1 Nov. 30, 2006

(30) Foreign Application Priority Data
May 27, 2005 (DE) .................. 10 2005 024 271

(51) Int. Cl.
*G01J 3/42* (2006.01)
(52) U.S. Cl. .................. 356/328; 356/326; 250/205
(58) Field of Classification Search .................. 356/328
See application file for complete search history.

(56) References Cited

U.S. PATENT DOCUMENTS

| 5,137,364 | A | * | 8/1992 | McCarthy | .................. 356/402 |
| 5,139,335 | A | | 8/1992 | Lundeen et al. | |
| 5,173,748 | A | | 12/1992 | Bilhorn | |
| 5,257,086 | A | * | 10/1993 | Fateley et al. | ................ 356/328 |
| 5,477,322 | A | | 12/1995 | Webster | |
| 6,690,466 | B2 | * | 2/2004 | Miller et al. | ................. 356/326 |
| 6,844,931 | B2 | * | 1/2005 | Ehbets | ........................ 356/328 |
| 2004/0257563 | A1 | | 12/2004 | Miller et al. | |

FOREIGN PATENT DOCUMENTS

| DE | 35 16 183 | 1/1986 |
| DE | 40 38 638 | 6/1992 |
| DE | 198 26 801 | 12/1999 |
| DE | 19826801 | 12/1999 |
| JP | 10253451 | 9/1998 |
| JP | 2000171299 | 6/2000 |
| WO | 97/32178 | 9/1997 |

* cited by examiner

*Primary Examiner*—Gregory J Toatley, Jr.
*Assistant Examiner*—Rebecca C Slomski
(74) *Attorney, Agent, or Firm*—Eugene LeDonne; Joseph W. Treloar; Frommer Lawrence & Haug LLP

(57) ABSTRACT

The present invention is directed to a grating spectrometer system for polychromator spectrometer arrangements and monochromator spectrometer arrangements. The grating spectrometer system, according to the invention, comprises a light source for illuminating the sample to be analyzed, a diffraction grating, imaging optical elements, a detector arranged in the image plane, and a controlling and regulating unit. Individual light sources, preferably LEDs having different spectral characteristics, whose spectral range covers a plurality of diffraction orders in the image plane are used as light source. Only those LEDs which do not illuminate the same location of the individual detectors arranged in the image plane in any diffraction order are switched on individually or in groups by the controlling and regulating unit. The proposed solution is suitable for polychromator spectrometer arrangements and for monochromator spectrometer arrangements. The field of application is determined by the spectral sensitivity of the detector that is employed. By using a plurality of diffraction orders, the resolution can be increased with the detector size remaining the same, or the detector surface can be reduced while retaining the same imaging quality.

12 Claims, 1 Drawing Sheet

GRATING SPECTROMETER SYSTEM AND METHOD FOR THE ACQUISITION OF MEASURED VALUES

CROSS-REFERENCE TO RELATED APPLICATION

This application claims priority of German Application No. 10 2005 024 271.5, filed May 27, 2005, the complete disclosure of which is hereby incorporated by reference.

BACKGROUND OF THE INVENTION a) Field of the Invention

The present invention is directed to a grating spectrometer system for polychromator spectrometer arrangements and monochromator spectrometer arrangements with more than one light source and a method for the acquisition and evaluation of measurement data.

b) Description of the Related Art

The spectrometer arrangements known from the prior art can be classified into two groups: monochromators and polychromators.

Monochromators make do with only one detector on which the spectral range to be measured is imaged and evaluated successively. However, the time required for measurement is necessarily prolonged and this has particularly disadvantageous results when the sample changes during the measurement period, as is generally the rule in process measurement systems, and when measuring an object in vivo.

In contrast, in polychromators the entire spectral region to be measured is imaged all at once on a detector with a plurality of individual portions and can therefore be measured simultaneously.

An arrangement of this kind comprising a diode array as detector, a concave grating, and a transparent supporting body constructed as a biconvex lens is described, e.g., in DE 40 38 638 A1.

In polychromator spectrometer arrangements, a correspondingly broad-band illumination of the sample is necessary. If one light source is not sufficient for this purpose, illumination by means of a plurality of light sources is also possible.

For this purpose, the light of the different radiation sources is coupled into the beam path. Light is coupled in simultaneously in the solution according to WO 97/35178 A1, but is coupled in successively in DE 198 26 801 A1 and U.S. Pat. No. 5,477,322 A. The advantage in switching on the light sources in succession consists in that scattered light is reduced and the load on the individual light sources is decreased. However, this increases the required measurement time.

Also known from the prior art are polychromators in which the entire spectral region to be imaged is separated into a plurality of diffraction orders. Additional components are required for separating into diffraction orders.

According to US 2004/0257563 A1 and U.S. Pat. No. 5,139,335 A, bandpass filters, for example, can be used for this purpose and must be provided for every diffraction order.

In contrast, the system described in DE 35 16 183 A1 uses a prism for separating the orders.

In the above-mentioned prior art solutions, it is disadvantageous that additional optical components are required for separating orders or for combining the individual light sources, or for both, so that the entire spectrum can be measured simultaneously with polychromator spectrometer arrangements. Other substantial disadvantages include large detector surfaces in polychromator measurement arrangements and long movement paths in monochromator measurement arrangements. This is particularly disadvantageous when only a discontiguous portion of the total spectrum is required for the application, e.g., regions 530 nm to 610 nm, 820 to 850 nm, and 940 to 960 nm, that is, only 130 nm of the total bandwidth of 430 nm are required for the detector surface or movement path.

OBJECT AND SUMMARY OF THE INVENTION

It is the primary object of the present invention to overcome the disadvantages of the solutions known from the prior art and to develop a spectrometer arrangement in which the illumination and the detector are optimally adapted to one another. The most compact possible spectrometer arrangement can accordingly be produced in a simple and economical manner.

According to the invention, this object is met by a grating spectrometer system comprising a light source for illuminating a sample to be analyzed, a diffraction grating, imaging optical elements, a detector arranged in the image plane and a controlling and regulating unit. The light source comprising at least two individual light sources having different spectral characteristics whose spectral range covers a plurality of diffraction orders in the image plane. Only those individual light sources which do not illuminate the same location of the detector arranged in the image plane in any direction order are switched on individually or in groups by the controlling and regulating unit.

The proposed grating spectrometer system with more than one light source and the method for acquiring measurement values are suitable for polychromator spectrometer arrangements as well as monochromator spectrometer arrangements. The field of application is determined by the spectral sensitivity of the detector that is employed.

The invention is described in the following with reference to an embodiment example.

DESCRIPTION OF THE PREFERRED EMBODIMENTS

The grating spectrometer system, according to the invention, comprises a light source for illuminating the sample to be analyzed, a diffraction grating, imaging optical elements, a detector arranged in the image plane, and a controlling and regulating unit. The light source comprises at least two individual light sources having different spectral characteristics whose spectral range covers a plurality of diffraction orders in the image plane. Only those individual light sources which do not illuminate the same location of the detector arranged in the image plane in any of the diffraction orders are switched on individually or in groups by the controlling and regulating unit.

The spectral range of all of the individual light sources comprises a plurality of (at least two) diffraction orders which are imaged on the detector arranged in the image plane. No devices or steps are provided for separating the diffraction orders.

According to the invention, the measured light signals are uniquely associated with a diffraction order in each instance in that a maximum of one light source which illuminates the same location of the image plane in any diffraction order is switched on.

Mirrors, lenses, light guides, or the like, for example, can be used as imaging optical elements. However, it is also possible to use an imaging diffraction grating which combines imaging characteristics and diffracting characteristics.

The grating spectrometer system according to the invention can be constructed as a polychromator spectrometer arrangement and as a monochromator spectrometer arrangement depending upon the detector that is used.

Figure 1:
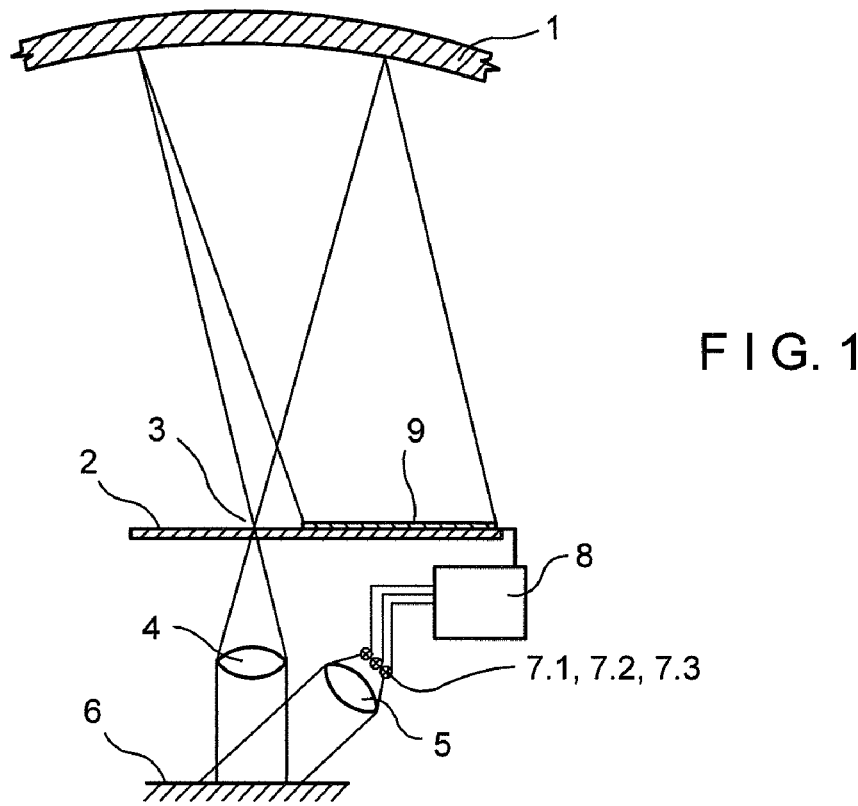
FIG. 1 shows the grating spectrometer system, according to the invention, as a polychromator arrangement.

In order to implement a polychromator spectrometer arrangement, a detector comprising a plurality of individual detector portions is used. The detector can be constructed as an array detector or matrix detector. FIG. 1 shows the grating spectrometer system, according to the invention, as a polychromator spectrometer arrangement by which samples are analyzed in the following three spectral regions of interest:

| | | |
|---|---|---|
| 1. Region: | 530 nm to 610 nm | |
| 2. Region: | 820 nm to 850 nm | |
| 3. Region: | 940 nm to 960 nm | |

The light source comprises three LEDs 7.1 to 7.3 by means of which the sample is illuminated at an angle of about 45°. The maxima of the spectral light output lie at 570 nm, 850 nm, and 940 nm, respectively. The half-width of the spectral light output is 40 nm in each instance and the one-tenth width is about 80 nm so that the three spectral regions of interest are illuminated with at least 1/10 of the maximum light output when using an LED. But it is also possible to use a plurality of LEDs to illuminate a spectral region of interest. For example, the first region can be illuminated with two LEDs having their maxima at 550 nm and 590 nm. These two LEDs are controlled and simultaneously switched on and off in a corresponding manner by the controlling and calculating unit. The current through the LEDs or their duty cycle is controlled by the controlling and calculating unit in such a way that the spectral regions are controlled to approximately the same level.

The light emitted by one or more LEDs is focused on the location of the sample 6 to be analyzed by means of focusing optics 5, reflected by the sample 6, and projected onto the entrance slit 3 by imaging optics 4. Proceeding from the entrance slit 3 in the housing 2, the light coming from the sample 6 is imaged by the imaging holographic diffraction grating 1 on the detector arranged in the image plane.

In the polychromator spectrometer arrangement, the detector comprises a plurality of individual detector portions. In the present case, a silicon photodiode array 9 (S8377-128Q, Hamamatsu) comprising 128 individual detector portions (pixels) in used. However, it is also possible to use a detector with detector portions which are distributed in two dimensions (matrix receiver). The signals of the pixels of a column on which the same spectral region is imaged are summed.

The output currents of the individual detector portions (pixels) are preferably converted by the controlling and calculating unit 8 into digital numerical values for further numerical calculation.

The grating spectrometer system has a spectral range of 1590 nm to 1920 nm in the first diffraction order, 895 nm to 960 nm in the second diffraction order, and 530 nm to 640 nm in the third diffraction order. Consequently, the first region of the spectral regions of interest is in the third diffraction order, and the two other regions are in the second diffraction order. The first diffraction order need no longer be considered because the silicon photodiode array 9 that is used cannot measure spectra above 1100 nm.

In the present advantageous constructional variant, the spectral range (product of diffraction order m and wavelength $\lambda$) m·$\lambda$=1590 nm to 1920 nm is apportioned to 128 pixels. A pixel corresponds to 2.6 nm in the first diffraction order, 1.3 nm in the second diffraction order, and 0.9 nm in the third diffraction order. The lower resolution in the longer-wave portion of the spectrum is not an effective disadvantage in view of the fact that the resolution at the long-wave end is also smaller in the prior-art spectrometer due to the greater distance from the optical axis.

Figure 2:
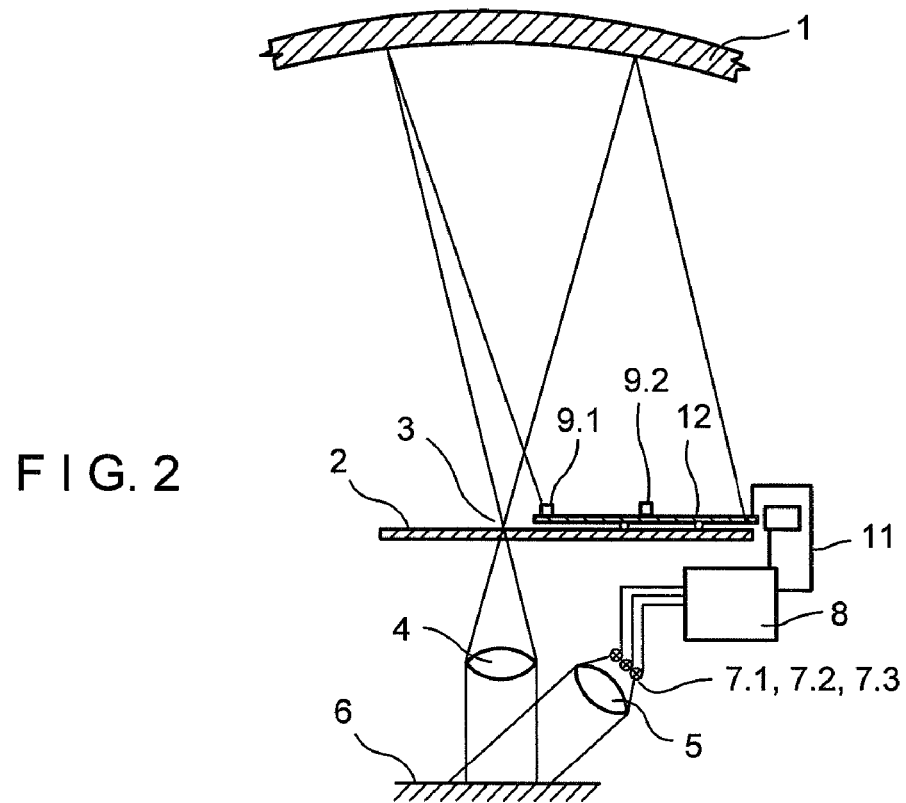
FIG. 2 shows the grating spectrometer system, according to the invention, as a monochromator arrangement.

To implement a monochromator spectrometer arrangement, one or more individual detectors which are moved simultaneously in the image plane to sweep the spectrum are used. FIG. 2 shows a grating spectrometer system which is constricted as a monochromator arrangement and which uses two individual detectors 9.1 and 9.2 which are moved in the image plane simultaneously. The distance between the two individual detectors preferably corresponds to one half of the length of the image plane. Samples in the three spectral regions of interest mentioned above are also analyzed with the monochromator spectrometer arrangement.

In this case also, as was already described, the sample is illuminated by three LEDs 7.1 to 7.3 by means of focusing optics 5 at an angle of about 45°, and the light that is reflected by the sample 6 is imaged by the imaging optics 4 on the entrance slit 3 in the housing 2 and then on the detector arranged in the image plane by the imaging holographic diffraction grating 1. The current through the LEDs 7.1 to 7.3 or their duty cycle is controlled by the controlling and calculating unit 8 in such a way that the spectral regions are controlled to approximately the same level and are switched on and switched off individually or in groups in such a way that a plurality of diffraction orders are imaged in the image plane simultaneously and no steps are provided for separating the diffraction orders. The two individual detectors 9.1 and 9.2 are arranged on a carrier plate 12 which has a drive unit 11 that is controlled by the controlling and calculating unit 8.

In this way, the use of two individual detectors 9.1 and 9.2 can reduce the measurement time required for acquiring the spectral region by approximately half In the method according to the invention for the acquisition of measured values, a sample to be analyzed is irradiated by a light source comprising at least two individual light sources having different spectral characteristics, and the reflected light or transmitted light is measured by a grating spectrometer system comprising a diffraction grating, imaging optical elements, and a detector arranged in the image plane. The individual light sources are switched on and switched off individually or in groups without a plurality of diffraction orders being imaged simultaneously in the image plane. All of the light sources can never be switched on simultaneously because otherwise a plurality of diffraction orders would overlap. A plurality of diffraction orders are imaged simultaneously in the image plane of the spectrometer without providing steps for separating the diffraction orders. According to the invention, the measured light signals are uniquely associated with a diffraction order in each instance in that a maximum of one of the light sources which illuminates the same location of the image plane in any diffraction order is switched on.

The sample is illuminated by three LEDs by focusing optics at an angle of about 45°, and the light reflected by the sample is imaged on the entrance slit by means of the imaging optics and, further, is imaged on the detector arranged in the image plane by an imaging holographic diffraction grating. The current through the LEDs or their duty cycle is controlled by the controlling and calculating unit in such a way that the spectral regions are controlled to approximately the same level.

The method, according to the invention, for the acquisition of measured values in grating spectrometer systems can be applied for polychromator spectrometer arrangements and for monochromator spectrometer arrangements depending on the detector that is used.

In order to implement a polychromator spectrometer arrangement, a detector is used which comprises a plurality of individual detector portions so that the imaged spectrum or the imaged diffraction orders can be detected all at once. The detector can be constructed as an array detector or a matrix detector.

The grating spectrometer system has a spectral range from 1590 nm to 1920 nm in the first diffraction order, 895 nm to 960 nm in the second diffraction order, and 530 nm to 640 nm in the third diffraction order. Consequently, the first region of the spectral region of interest is in the third diffraction order and the two other regions are in the second diffraction order.

The acquisition of measured values in a polychromator spectrometer arrangement is described in the following. In this connection, samples are analyzed in the following three spectral regions of interest that were already mentioned:

| 1. Region: | 530 nm to 610 nm |
| 2. Region: | 820 nm to 850 nm |
| 3. Region: | 940 nm to 960 nm |

In this case also, the light source comprises three LEDs 7.1 to 7.3 whose maxima with respect to spectral light output lie at 570 nm, 850 nm, and 940 nm. The half-width of the spectral light output is 40 nm in each instance, and the one-tenth width is about 80 nm so that the three spectral regions of interest are illuminated with at least 1/10 of the maximum light output when using an LED.

The acquisition of measured values is carried out in the following manner in particular: First, all LEDs (7.1 to 7.3) are switched off by the controlling and calculating unit. The values of the detector array which are read out in this state are stored as dark signal values. The LEDs 7.1 and 7.2 are then switched on. This is possible because the spectral regions to be analyzed are imaged on the detector surface next to one another and do not overlap (the product of the diffraction order m and the wavelength $\lambda$ is: $m \cdot \lambda = 1590$ nm to 1830 nm or $m \cdot \lambda = 1880$ nm to 1920 nm). The current through the LEDs or their duty cycle is controlled in such a way that the two spectral regions are controlled to approximately the same level. The dark signal values that were stored previously are subtracted from the values (gross signal values) of the detector array that were read out in the illuminated state. This gives the net signal values which are proportional to the light energy received by the detector portion (pixel). The LEDs 7.2 and 7.3 are then switched on. This is possible because both spectral regions lie in the same diffraction order (m=2). The current through the LEDs or their duty cycle are again controlled in such a way that the two spectral regions are controlled to approximately the same level. Here again, the net signal values are calculated in the manner described above.

The advantage in switching on the light diode 7.2 twice is that the net signal values of both measurements can be averaged so that the noise is reduced. This is important because the sensitivity of the Si photodetector drops sharply at the long-wave end of the spectral region. The lower signal/noise ratio entailed in this is at least partially compensated by the signal averaging.

When a plurality of LEDs are used for illuminating a spectral region of interest, the controlling and calculating unit must ensure that these LEDs are appropriately controlled and switched on and off simultaneously. Further, the current through the LEDs or their duty cycle should be controlled in such a way that the spectral regions are controlled to approximately the same level.

In the polychromator spectrometer arrangement, the detector comprises a plurality of individual detector portions. In the present case, a silicon photodiode array 9 (S8377-128Q by Hamamatsu) comprising 128 individual detector portions (pixels) is used. However, it is also possible to use a detector with detector portions that are distributed in two dimensions (matrix receivers). In this case, the signals of the pixels of a column on which the same spectral region is imaged are summed. In this way, it is possible to partially compensate for tolerances of the spectrometer arrangement. Under certain circumstances, matrix receivers are more economical than array detectors.

On the other hand, in order to implement a monochromator spectrometer arrangement, one or more individual detectors that are moved simultaneously in the image plane are used.

The acquisition of measured values in a monochromator spectrometer arrangement by which samples are to be examined in the three above-mentioned spectral regions of interest is described in the following.

With the exception of the detector, the arrangement that was already described above is used.

The detector is initially positioned at the beginning (short-wave end) of the spectral region ($m \cdot \lambda = 1590$ nm) by the controlling and calculating unit by means of the drive unit. The LEDs are switched on and off according to the following Table 1. The net signal values are calculated from the gross signal values and dark signal values as was already described. The switching sequence for each spectral region can be carried out multiple times and the measurement results are averaged.

To measure the next spectral region, the detector is displaced in direction of longer wavelengths. The displacement can be carried out continuously or stepwise.

TABLE 1

| Region m · $\lambda$ [nm] | Switching sequence of the LEDs with one detector |
|---|---|
| 1590-1640 | all LEDs off → LED 7.1 on |
| 1640-1830 | all LEDs off → LED 7.1 on → LED 7.2 on |
| 1830-1880 | all LEDs off, no measurement, fast run-through |
| 1880-1920 | all LEDs off → LED 7.3 on |

While only the third diffraction order of LED 7.1 occurs in the region of 1590 nm to 1640 nm, the second diffraction order of LED 7.2 is also imaged, in addition to the third diffraction order of LED 7.1, in the region of 1640 nm to 1830 nm.

No diffraction order of any of the LEDs is imaged in the region from 1830 nm to 1880 nm, so that a measurement need not be carried out in this range. This region can be run through quickly with continuous displacement or run through with a high step frequency in case of stepwise displacement.

In the range of 1880 nm to 1920 nm, only the second diffraction order of LED 7.3 is imaged.

In a particularly advantageous embodiment, two individual detectors which are moved simultaneously in the image plane are used for implementing a monochromator spectrometer arrangement. The distance between the two individual detectors preferably corresponds to one half of the length of the image plane. The two individual detectors are arranged on a carrier plate.

The individual detectors which are arranged in a stationary manner on a common carrier plate are initially positioned at the beginning (m·λ=1590 nm) and at the middle (m·λ=1755 nm) of the spectral region by the controlling and calculating unit by means of the drive unit. The LEDs are switched on and off according to the following Table 2, and the net signal values are calculated in a corresponding manner. In this case also, the switching sequence can be carried out multiple times in one position, and the measurement results are averaged. The carrier plate with the individual detectors is then displaced in direction of longer wavelengths. The displacement can be carried out continuously or stepwise in this case also.

TABLE 2

| Region m · λ [nm] | | Switching |
|---|---|---|
| 1st Detector | 2nd Detector | sequence of the LEDs with two detectors |
| 1590-1665 | 1755-1830 | all LEDs off → LED 7.2 on → LED 7.1 on |
| 1665-1715 | 1830-1880 | all LEDs off → LED 7.1 on → LED 7.2 on (no evaluation of detector 2 is required) |
| 1715-1755 | 1880-1920 | all LEDs off → LEDs 7.1 and 7.3 on → LEDs 7.2 and 7.3 on |

While the second diffraction order of LED 7.2 occurs in the region from 1590 nm to 1665 nm, the third diffraction order of LED 7.1 is imaged simultaneously in the region from 1755 nm to 1830 nm.

In contrast to the first switching sequence, the second diffraction order of LED 7.2 and the third diffraction order of LED 7.1 are imaged on the first detector in the region of 1665 nm to 1715 nm in the second switching sequence. There is no need to evaluate the second detector.

In the first step of the third switching sequence, the third diffraction order of LED 7.1 is imaged in the region of 1715 nm-1755 nm and the second diffraction order of LED 7.3 is imaged in the region of 1880 nm-1920 nm simultaneously. In the second step of this switching sequence, third diffraction orders of LEDs 7.2 and 7.3 are imaged simultaneously.

In this case also, it is advantageous to determine and average a plurality of measured values for LEDs 7.1 to 7.3.

Since the LED 7.3 has the greatest temperature dependency because of its radiated spectrum and its maxima of the spectral light output of the greatest maximum wavelength of 940 nm, the voltage measured across LED 7.3 can be used to compensate for the temperature dependency. For this purpose, LED 7.1 is fed by a first power source and LEDs 7.2 and 7.3, which are connected in series, are fed by a second power source. The voltage is measured across LED 7.3 and sent back to the controlling and calculating unit 8 as a controlled variable. However, it is also possible to measure the voltages of additional LEDs or of all LEDs for monitoring purposes or to let the measured values enter into the controlled variable.

The voltage drop across the LEDs depends additionally upon the LED junction temperature. In order to take this into account, the signals of the null sample are stored in the controlling and calculating unit 8 for at least two extreme temperatures or parameters, the parameters describing the curve shape, e.g., maximum wavelength and half-width with the associated LED voltages.

The signal of the null sample at the instantaneous temperature is calculated by means of the instantaneous LED voltage, e.g., by linear interpolation.

The signal of the null sample which is corrected in this way is used to calculate the optical density of the sample. Accordingly, it is no longer necessary to determine the null sample again with every change in the operating temperature of the LED. Therefore, a device for swinging the null sample into the beam path can be dispensed with. The voltage of additional LEDs can be used to compensate their voltage dependency.

A further possibility for temperature correction of the measured values is described in the following:

Assuming that the curve shape of the spectral light output of the LEDs $P_i(\lambda-\lambda_i)$ is approximately independent of temperature or specimen, the signal of the null sample need only be measured at one temperature. The curve shapes $P_i(\lambda-\lambda_i)$ are determined once based on a few LEDs and then used for all devices of the series.

The optical density of the sample is corrected in that it is increased by the following value. Summing is carried out over all LEDs that are switched on at the same time.

$$k(\lambda) = \frac{\sum_i \frac{U_i - U0_i}{D_i} \cdot [C_i \cdot P_i(\lambda - \lambda_i) - A_i \cdot P_i'(\lambda - \lambda_i)]}{\ln(10) \cdot \sum_i P_i(\lambda - \lambda_i)},$$

where:
$\lambda_i$ corresponds to the wavelength of the maximum spectral light output of the ith LED
$A_i$ corresponds to the temperature coefficient of the maximum wavelengths $\lambda_i$ of the ith LED
$P_i'$ corresponds to the derivations of the spectral light output according to the wavelength of the ith LED
$U_i$ corresponds to the flux voltage of the ith LED determined during the sample measurement
$U0_i$ corresponds to the flux voltage of the ith LED determined during the null sample measurement
$C_i$ corresponds to the temperature coefficient of the light output of the ith LED, and
$D_i$ corresponds to the temperature coefficient of the flux voltage of the ith LED.

In the grating spectrometer system and method for acquisition of measured values according to the invention, a solution is suggested which overcomes the disadvantages of the solutions known from the prior art and in which the illumination and the detector are adapted to one another in an optimal manner. The solution is simple and economical to produce in a compact constructional form. The measuring time required for acquiring the spectral regions can be reduced without expensive, large-area detector surfaces which are very cost-intensive particularly for NIR spectroscopy or IR spectroscopy.

By using a plurality of diffraction orders, the resolution can be substantially increased with the detector size remaining the same, or the detector surface can be reduced while retaining the same imaging quality and light throughput.

While the foregoing description and drawings represent the present invention, it will be obvious to those skilled in the art that various changes may be made therein without departing from the true spirit and scope of the present invention.

What is claimed is:
1. A grating spectrometer system comprising:
a light source that illuminates a sample to be analyzed;

a diffraction grating that receives illumination reflected off of the sample from the light source;

imaging optical elements;

a detector arranged in the image plane that receives images of a plurality of diffraction orders from the diffraction grating simultaneously; and a controlling and regulating unit;

wherein said light source comprises at least two individual light sources having different spectral characteristics whose spectral range, after being diffracted by the diffraction grating, covers a plurality of diffraction orders which are imaged on the detector in the image plane; and wherein only those individual light sources which do not illuminate the same location of the detector arranged in the image plane in any diffraction order are switched on in groups by the controlling and regulating unit.

2. The grating spectrometer system according to claim 1; wherein the diffraction grating is constructed in such a way that no imaging optical elements are located between the diffraction grating and the detector.

3. The grating spectrometer system according to claim 1; wherein the detector is constructed as an array detector or matrix detector for implementing a polychromator spectrometer arrangement.

4. The grating spectrometer system according to claim 1; wherein one or more individual detectors which are moved in the image plane at the same time are used for implementing a monochromator spectrometer arrangement.

5. The grating spectrometer system according to claim 4; wherein two individual detectors which are moved in the image plane at the same time are used in the monochromator spectrometer arrangement, the distance between the two individual detectors corresponding to one half of the length of the image plane.

6. The grating spectrometer system according to claim 1; wherein LEDs having different spectral characteristics are used as individual light sources.

7. A method for the acquisition of measured values in a grating spectrometer system comprising a light source that illuminates a sample to be analyzed, a diffraction grating that receives illumination reflected off of the sample from the light source, imaging optical elements, a detector arranged in the image plane that receives images of a plurality of diffraction orders from the diffraction grating simultaneously, and a controlling and regulating unit, said method comprising:

the step of irradiating a sample by a light source comprising at least two individual light sources having different spectral characteristics whose spectral range, after being diffracted by the diffraction grating, covers a plurality of diffraction orders which are imaged on the detector in the image plane;

the step of splitting the light of the individual light sources reflected by the sample by the diffraction grating and then imaged in a plurality of diffraction orders on the detector arranged in the image plane; and the step of switching on the individual light sources which do not illuminate the same location of the detector in any diffraction order in groups by the controlling and regulating unit.

8. The method according to claim 7, further comprising: the step of constructing the diffraction grating in such a way that no imaging optical elements are located between the diffraction grating and the detector.

9. The method according to claim 7, further comprising: the step of constructing the detector as an array detector or matrix detector for implementing a polychromator spectrometer arrangement.

10. The method according to claim 7, further comprising: the step of moving one or more individual detectors in the image plane at the same time for implementing a monochromator spectrometer arrangement.

11. The method according to claim 10; wherein two individual detectors which are moved in the image plane at the same time are used in the monochromator spectrometer arrangement; and wherein it is provided that the distance between the two individual detectors corresponds to one half of the length of the image plane.

12. The method according to claim 7; wherein LEDs with different spectral characteristics are used as individual light sources.

* * * * *

UNITED STATES PATENT AND TRADEMARK OFFICE
CERTIFICATE OF CORRECTION

| | | |
|---|---|---|
| PATENT NO. | : 7,692,790 B2 | Page 1 of 1 |
| APPLICATION NO. | : 11/382584 | |
| DATED | : April 6, 2010 | |
| INVENTOR(S) | : Felix Kerstan and Nico Correns | |

It is certified that error appears in the above-identified patent and that said Letters Patent is hereby corrected as shown below:

On the Cover Page:

Please correct the Assignee from "CARL ZEISS MICROIMAGING GmbH" to --Carl Zeiss MicroImaging GmbH--.

Signed and Sealed this
Seventh Day of June, 2011

David J. Kappos
*Director of the United States Patent and Trademark Office*